(12) United States Patent
Svorc

(10) Patent No.: US 9,312,747 B1
(45) Date of Patent: Apr. 12, 2016

(54) FAST START-UP CIRCUIT FOR LOW POWER CURRENT MIRROR

(71) Applicant: Dialog Semiconductor (UK) Limited, Reading (GB)

(72) Inventor: Jindrich Svorc, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 6 days.

(21) Appl. No.: 14/550,924

(22) Filed: Nov. 22, 2014

(30) Foreign Application Priority Data

Nov. 20, 2014 (EP) .................................. 14194209

(51) Int. Cl.
*H02M 1/36* (2007.01)
*G05F 3/26* (2006.01)

(52) U.S. Cl.
CPC .. *H02M 1/36* (2013.01); *G05F 3/26* (2013.01)

(58) Field of Classification Search
CPC ............. H02M 1/36; G05F 3/26; G05F 1/468
USPC ..................................... 363/49; 323/315, 901
See application file for complete search history.

(56) References Cited

U.S. PATENT DOCUMENTS

| 5,179,301 | A | * | 1/1993 | Hughes | .................. | G06G 7/184 |
|---|---|---|---|---|---|---|
| | | | | | | 323/315 |
| 5,281,866 | A | | 1/1994 | Rundel | | |
| 5,892,381 | A | | 4/1999 | Koifman et al. | | |
| 6,016,050 | A | | 1/2000 | Brokaw | | |
| 6,057,721 | A | | 5/2000 | Nolan et al. | | |
| 6,285,223 | B1 | | 9/2001 | Smith | | |
| 8,988,143 | B2 | * | 3/2015 | Berkhout | ................. | G05F 3/262 |
| | | | | | | 323/312 |
| 9,018,923 | B2 | * | 4/2015 | Parkhurst | .............. | H02M 3/156 |
| | | | | | | 323/238 |
| 2002/0024329 | A1 | * | 2/2002 | Guthrie | .................... | G05F 3/262 |
| | | | | | | 323/315 |
| 2003/0067291 | A1 | | 4/2003 | Hong | | |
| 2005/0264344 | A1 | | 12/2005 | Kim et al. | | |
| 2011/0006749 | A1 | | 1/2011 | Stellberger et al. | | |
| 2013/0187629 | A1 | * | 7/2013 | Figueiredo | ............ | H03M 1/002 |
| | | | | | | 323/315 |

OTHER PUBLICATIONS

European Search Report 14194209-1807, Aug. 4, 2015, Dialog Semiconductor (UK) Ltd.
"A Fast Start-up 3GHz-10GHz Digitally Controlled Oscillator for UWB Impulse Radio in 90nm CMOS," by Vincent De Heyn et al., 33rd European Solid State Circuits Conference, 2007, ESSCIRC, IEEE, Sep. 1, 2007, pp. 484-487.
Co-pending U.S. Appl. No. 14/550,925, filed Nov. 22, 2014, "Fast Bias Current Startup with Feedback," by Jindrich Svorc, 20 pgs.

* cited by examiner

*Primary Examiner* — Gary L Laxton
(74) *Attorney, Agent, or Firm* — Saile Ackerman LLC; Stephen B. Ackerman

(57) ABSTRACT

A fast startup circuit delivers current to a number of loads, comprising a P-channel current mirror circuit that provides current to an N-channel current mirror circuit that distributes current to a plurality of circuit networks. A first capacitor and a second capacitor are charged to two different voltages when the circuit is disabled and the two voltages are equalized when the circuit is enabled creating an initial operational starting point that has a steady state operating voltage that is the same as that during continuous operations. Thus there is no waiting for the fast startup circuit to start from an off condition and build up exponentially to a steady state operational level.

20 Claims, 3 Drawing Sheets

FAST START-UP CIRCUIT FOR LOW POWER CURRENT MIRROR

RELATED PATENT APPLICATION

This application is related to U.S. patent application Ser. No. 14/550,925, filed on Nov. 20, 2014, and assigned to the same assignee as the present invention, and which is herein incorporated by reference in its entirety.

TECHNICAL FIELD

The present disclosure is directed to a fast start-up circuit, in particular for a low power current mirror.

BACKGROUND

In general every analog block within an integrated circuit needs a current bias to allow for proper operation. A main current bias distribution within a chip can be a current source that is distributed within an integrated circuit chip by means of a few current mirror circuits. The bias current causes additional power consumption.

Because the bias current is additional power consumption for the chip, the actual used value is small, especially in very low power design, which can be down to a few tenths of a nano-amp. Such a small current is prone to being disturbed by other circuitry on the chip and sometimes by the biased block itself. In order to filter such a noise disturbance a simple low pass filter usually created by normal capacitor or MOS capacitor is added.

US 2011/0006749A1 (Stellberger et al.) is directed to systems and methods to achieve a start-up circuit of bandgap voltage reference generator circuits. US 2003/0067291A1 (Hong) is directed to a bandgap voltage reference circuit and a fast start-up circuit. U.S. Pat. No. 6,057,721 (Nolan et al.) is directed to a fast start-up circuit for use in integrated circuits. U.S. Pat. No. 6,016,050 (Brokaw) is directed to a Start-up and bias circuit that provides a fixed bias current. U.S. Pat. No. 5,892,381 (Koifman et al.) is directed to faster start-up without added circuit complexity. U.S. Pat. No. 5,281,866 (Rundel) is directed to a reference voltage circuit in an analog to digital converter.

In FIG. 1 is shown a bias circuit of prior art, wherein a main current bias, Ibias, is distributed by means of current mirrors like P1 and P2. Since the bias current is additional power consumption, the actual amount used is reasonably small, especially in very low power design that can be down to few tenths of nano-amps. These small current amounts are prone to be disturbed by other circuitry on the chip, which can be sometimes disturbed by the biased block itself. A simple low pass filter, usually created by a normal capacitor or MOS capacitor is added to filter noise and disturbance from other circuitry. This capacitor might be also created by the input gate capacitance of all the mirror transistors which are connected to the nbias node so it disappears from the schematic, but it is still present. It is depicted in FIG. 1 as C1. This low pass filter filters the nbias node voltage and makes the currents Ibias_2 and Ibias_x less noisy.

Using capacitance C1 to filter noise has a drawback, which is long start-up time of the circuit. When the block is disabled, the disable switch S2 is ON and enable switch S1 is OFF. This means the nbias voltage is 0V, and voltage at nswitch is equal to Vdd. When the current bias is enabled, the disable switch S2 is turned OFF and enable switch S1 is turned ON. Bias current starts flowing from drain of P2, which starts the charging of C1. At that moment no current is flowing through Ibias_2 through Ibias_x branches. The voltage in nbias is increasing as C1 is being charged and finally at the moment when the nbias reaches threshold voltage of the transistor Nx, the current in the branches 'Ibias_x' starts flowing. It takes even a longer time until the current in the Ibias_x branch is fully settled.

FIG. 2 shows waveforms at key locations in the circuit of FIG. 1. As switch S1 is closed, switch S2 is opened, causing voltage at node nswitch to fall to ground before recovering to nbias that is between Vdd and 0V. The current Ibias_2 is somewhat delayed beyond the start of nbias until the gate of the N2 transistor is brought up to a threshold voltage.

SUMMARY

It is an objective of the present disclosure to split the capacitor into two capacitors, wherein one capacitor remains connected between nbias and ground and the second capacitor is connected between nswitch and ground, wherein the two capacitors are charged with a different potential during the time the current distribution circuit is disabled.

Further it is an objective of the present disclosure to apply a current boost to the second capacitor, wherein the current boost helps speed-up other circuitry driven by the current distribution circuitry.

A fast startup circuit for a low power current mirror circuit distributes current to a plurality of circuits, wherein an Ibias current is coupled with a P channel current mirror circuit to an N channel current mirror circuit that further distributes a plurality of bias currents Ibias 2 to Ibias x to a plurality of circuits. The N channel current mirror is controlled by at least two switches, which are mutually exclusive, and enable (disable) the N channel current mirror circuits.

In a first embodiment an existing capacitor is split into two capacitors, wherein the two capacitors are charged to different potentials during the time the startup circuit is disabled. The first of the two capacitors, connected between the nbias node and ground, is discharged. The second of the two capacitors, connected between the nswitch node and ground, is charged to Vdd. When the startup circuit is enabled charge flows from the second of the two capacitors to the first of the two capacitors to equalize charge and establish the voltage Vbnss at the nbias node, which is the steady state voltage at nbias during normal operations. This for all practical purposes eliminates the exponential waveform at startup compared to the startup circuit of prior art.

In a second embodiment the second split capacitor is connected directly to Vdd with S3 when the startup circuit is disabled. This protects against the P-channel current from also being turned off when the circuit is disabled. If further the size of the second capacitor, C1b, is larger than indicated by (C1a+Cgtot)/C1b=(VddNbnss)−1, where Cgtot is the gate capacitance of all N-channel transistors connected to the nbias node as well as other parasitic capacitance, then a startup current boost is generated initially when the startup circuit is enabled. This bias current boost helps speedup the start up of other circuitry being powered by the startup current of the low power current mirror circuit of the present disclosure. The current boost applied to the second capacitor, C1b, helps speed up the charging of parasitic capacitances of any node connected to bias current distribution network. If for some reason there are more current branches connected in series, a current boost provides a peak current when the circuit is being enabled, helping to charge all the branches and other circuitry faster.

BRIEF DESCRIPTION OF THE DRAWINGS

This disclosure will be described with reference to the accompanying drawings, wherein.

DETAILED DESCRIPTION

Figure 3:
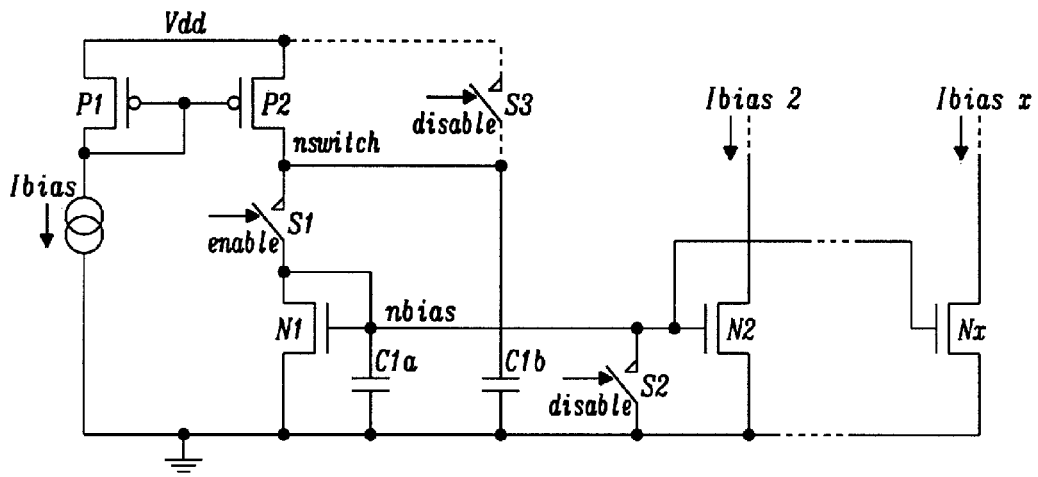
FIG. 3 is a fast startup circuit of the present disclosure.

In FIG. 3 is shown a fast startup circuit of the present disclosure. The fast startup circuit comprises a P-channel current mirror circuit configured by transistors P1 and P2 and connected to circuit bias Vdd, and an N-channel current mirror circuit configured by a current source transistor N1 and a plurality of current load transistors N2 to Nx. The source current is Ibias connected in the current source leg of the P-channel current mirror circuit and delivered to N1 by the current load transistor P2 of the Pchannel current mirror. The current source transistor N1 of the N-channel current mirror circuit delivers Ibias to each current load transistor N2 to Nx, producing Ibias_2 to Ibias_x. Thus the source current Ibias is distributed to a plurality of loads by means of the connection of the P-channel current mirror circuit to the N-channel current mirror circuit.

A capacitor used to reduce disturbance in the load currents Ibias_2 to Ibias_x is split into two capacitors C1a and C1b where the total capacitance remains the same as the pre-split capacitor. Capacitor C1a is connected between the N-channel current mirror net designated nbias and circuit ground, and along with Cgtot (total gate capacitance of all gates connected to the nbias net. Capacitor C1b is connected between the nswitch node at transistor P2 and circuit ground. When the enable switch S1 is opened and the disable switch S2 is closed the nbias net of the N-channel current mirror is shorted to ground and capacitor C1a is charged to zero volts. At the same time C1b is charged to circuit bias, Vdd. It should be noted that the enable switch S1 and the disable switch S2 are mutually exclusive and cannot be switched on, or switched off, at the same time.

Figure 1:
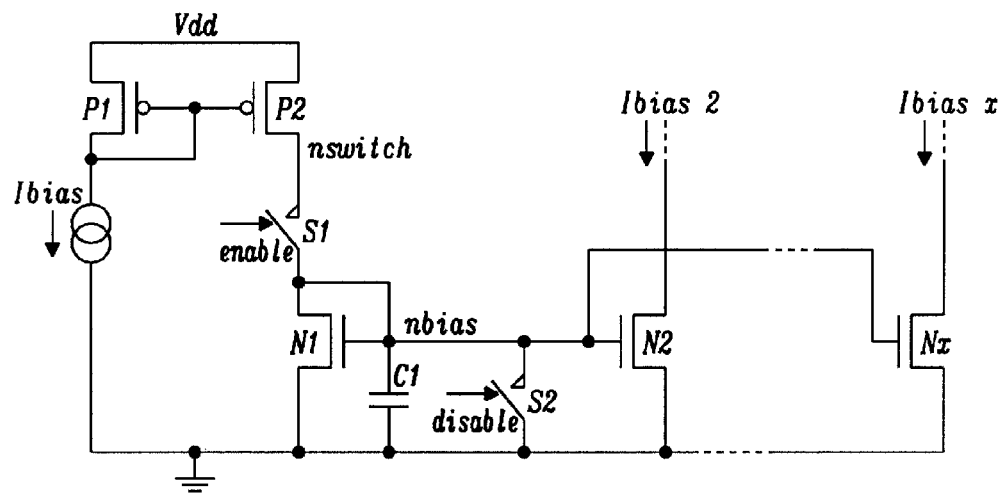
FIG. 1 is a typical bias circuit used in an integrated circuit of prior art.
Figure 2:
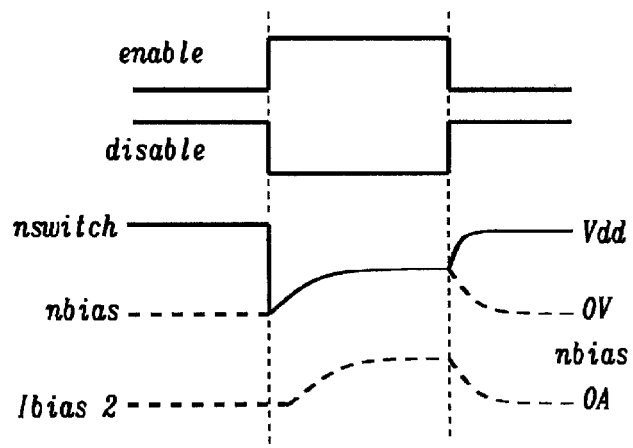
FIG. 2 is a display of waveforms of the typical bias circuit of FIG. 1.
Figure 4:
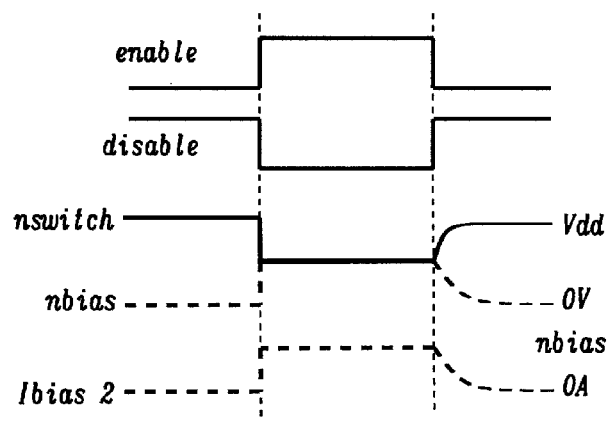
FIG. 4 is a display of waveforms of the fast startup circuitry of the present disclosure excluding switch S3.

When the circuit is enabled switch S1 is closed and switch S2 is opened. The voltages in the two capacitors normalize and the voltage on the nbias net of the N-channel current mirror circuit becomes Vbnss, where (C1a+Cgtot)/C1b= (VddNbnss)−1. The results of combining the bias voltages of C1a and C1b is immediately clear by viewing FIG. 4 where the voltage at nodes nswitch and nbias and the current a ibias 2 for example immediately upon circuit enabling come to a steady state condition where the exponential rise time of the prior art (FIG. 2) is eliminated.

A second disable switch S3 is connected between circuit bias Vdd and Cib. The purpose of this connection is to provide a backup to the connection of Vdd to C1b during when the circuit is disabled to protect against the P-channel current mirror from also being disabled. This connection is redundant and does not change the dynamics the fast startup circuit.

Figure 5:
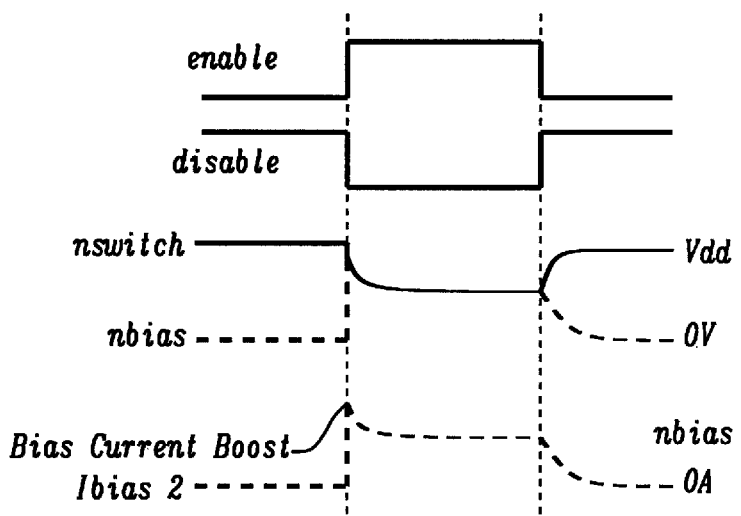
FIG. 5 is a display of waveforms of the fast startup with bias boost of the present disclosure.

If the capacitance C1b is larger than that expressed by the ratio of (C1a+Cgtot)/C1b=(VddNbnss)−1, then a startup bias current boost peak is created as shown in FIG. 5. As can be seen the boost peak a part of the output currents Ibias_2 to Ibias_x of the N-channel current mirror output. The boost current helps to speed up the startup of circuitry driven by the current output of the N-channel current mirror While the disclosure has been particularly shown and described with reference to preferred embodiments thereof, it will be understood by those skilled in the art that various changes in form and details may be made without departing from the spirit and scope of the disclosure.

What is claimed is:

1. A fast startup circuit, comprising:
   a) a first capacitor charged to zero volts when a disable switch is closed
   b) a second capacitor charged to a bias voltage when the disable switch is closed; and
   c) a current mirror circuit enabled in which the disable switch is opened and a enable switch is closed, wherein the current mirror circuit comprises the first and second capacitors, and wherein charge on the first and second capacitors equalize causing current in the current mirror circuit to start at a steady state operating value.

2. The circuit of claim 1, wherein the first capacitor is split to form the second capacitor, wherein the sum of the capacitance of the first and second capacitor is equal to the capacitance of the first capacitor prior to being split.

3. The circuit of claim 1, wherein the disable switch when closed shorts the first capacitor to ground, charging the first capacitor to zero volts.

4. The circuit of claim 1, wherein the enable switch is open when the disable switch is closed, which separates a bias source from the current mirror circuit.

5. The circuit of claim 1, wherein the enable switch and the disable switch are mutually exclusive.

6. The circuit of claim 1, wherein said current mirror circuit when enabled produce a voltage on the base of the N channel transistor of the current mirror current source, which is a result of the combined charge on the first and second capacitors, that is equal to steady state voltage during continuous operations, thereby starting circuit operations at normal steady state conditions.

7. The circuit of claim 1, wherein the first capacitor is connected between the base of the current source transistor of the N channel current mirror circuit and circuit ground.

8. The circuit of claim 1, wherein the second capacitor is connected between a current load circuit of a P channel current mirror circuit and circuit ground.

9. The circuit of claim 1, wherein said first and said second capacitors provide a capability to filter noise on the present current mirror circuit.

10. The circuit of claim 1, wherein said N-channel current mirror circuit drives a plurality of current loads.

11. The circuit of claim 1, wherein the second capacitor has a capacitance that is larger than a ratio of VddNbnss, then a startup bias current boost peak is generated.

12. The circuit of claim 11, wherein the current boost peak helps speed up the startup of other circuitry.

13. A method of starting a current mirror circuit at steady state conditions, comprising:
   a) splitting a capacitor into two capacitors having the same total capacitance prior to being split;
   b) connecting the first of the two capacitors between the base terminal of an NMOS transistor and circuit ground, and charging the first of the two capacitors to zero volts when the current mirror circuit is disabled by a closed disable switch and an open enable switch;
   c) connecting the second of the two capacitors between a P-channel transistor connected to circuit bias and circuit ground, and charging the second of the two capacitors to circuit bias voltage when the current mirror circuit is disabled; and d) enabling the NMOS current mirror circuit, wherein the charge on the two capacitors normalizes causing current in the current mirror circuit to start at a steady state operating value.

14. The circuit of claim 13, wherein the disable switch and the enable switch are mutually exclusive and cannot be on, or off, at the same time.

15. The method of claim 13, wherein the NMOS transistor is a current source for the NMOS current mirror circuit.

16. The method of claim 13, wherein the base terminal of the NMOS transistor is shorted to ground when the current mirror circuit is disabled.

17. The method of claim 13, wherein the P-channel transistor is the current load transistor of a P-channel current mirror, and is connected to circuit bias.

18. The method of claim 13, wherein the second capacitor is connected directly to circuit bias with a second disable switch and if the second capacitor has a capacitance that is larger than a ratio of VddNbnss, then a startup bias current boost peak is generated.

19. The circuit of claim 18, wherein the current boost peak helps speed up the startup of other circuitry.

20. The circuit of claim 18, wherein the voltage Vdd is circuit bias voltage and Vbss is the steady state voltage on the net connected to the base terminals of the NMOS transistors.

* * * * *